Oct. 21, 1958   R. A. BONETTI   2,857,186

SHAFT LOCKING MEANS

Filed April 26, 1954

INVENTOR.
RALPH A. BONETTI
BY
ATTORNEY

United States Patent Office 2,857,186
Patented Oct. 21, 1958

2,857,186
SHAFT LOCKING MEANS

Ralph A. Bonetti, Aurora, Colo., assignor, by mesne assignments, to Minneapolis-Honeywell Regulator Company, Minneapolis, Minn., a corporation of Delaware Application April 26, 1954, Serial No. 425,691

3 Claims. (Cl. 287—20)

This invention relates to means for locking a rotatable member to a fixed member so as to prevent relative rotation between the members, and more particularly to such locking means as will not disturb the relative positions of the shafts at or during the time that locking is being accomplished.

One of the objects of my invention is to associate with a rotatable member, such as a shaft, a means for easily and quickly locking the member against rotation relative to its support member without disturbing the position of the rotatable member when locking is desired.

A further object is to produce a locking means for a rotatable member as above referred to which will remain in locking condition notwithstanding severe vibrating conditions.

A more specific object is to produce a means for locking a rotatable shaft to a fixed support which will move to a locking condition with the shaft and to a releasing position without disturbing any set position of the shaft.

Yet a further condition is to produce a locking mechanism for a shaft which will repetitively lock the shaft as desired by a like actuation of the lock actuating member and further will always function to cause locking in a like manner, regardless of how it may be mounted in relation to the shaft axis.

Yet another object is to provide locking means for a shaft which will be controllable by a single rotatable actuator and will function to cause locking by the movement of the actuator in opposite directions from a released position by a simple relocation of certain parts thereof.

Still a further object is to produce a locking mechanism for a shaft which will fit around the shaft, be easily operable by hand by a rotation of an actuating member about the shaft axis, will be compact and will comprise a minimum number of parts easily manufactured at a low cost.

Figure 1:
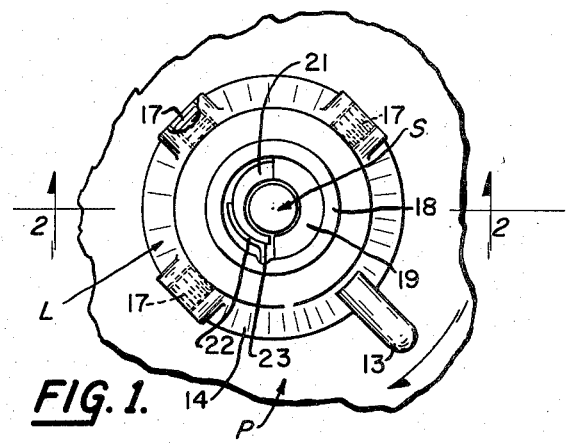
Figure 2:
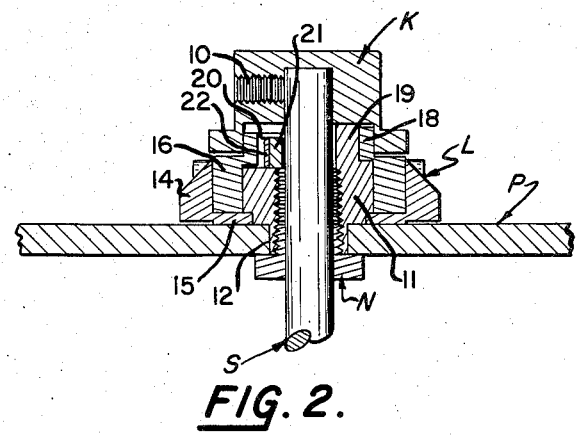

Other objects of my invention will become apparent from the following description taken in connection with the accompanying drawings in which:

Figure 1 is a front view of my improved locking mechanism as associated with an instrument shaft, said shaft having removed therefrom its rotating knob in order to better disclose parts of the locking mechanism; and Figure 2 is a cross sectional view taken on the line 2—2 of Figure 1 showing additional details of the locking mechanism.

I have illustrated my invention as being embodied in a locking mechanism for an instrument shaft where it is desired to provide in a small space an easily operable unit for locking and unlocking the shaft to a panel or other support structure by simple movements of an actuating member and in such a manner that the setting of the shaft will not be disturbed. As shown, the instrument shaft is generally indicated by the letter S which is mounted for rotation in a support structure shown as a panel board P. This shaft at its outer free end beyond the exterior side of the panel has a knob K attached thereto by a set screw 10 whereby the shaft may be rotated as and when desired. The shaft is supported in the panel by a bearing sleeve 11 held in an opening 12 by a clamp nut N fitting the shaft. The bearing sleeve is constructed to have mounted thereon my improved locking mechanism generally indicated by the letter L.

The locking mechanism includes a locking lever 13 which has a hub structure 14 surrounding the bearing sleeve 11 and rotatable thereon by means of an inner annular flange 15. Between the hub 14, which is of larger diameter than the sleeve 11, is positioned a locking collar 16 which is attached to the hub 14 to rotate therewith as a unit by set screws 17 shown as three in number. This locking collar has an outwardly extending annular flange 18 of reduced diameter which projects into a hollow part of the knob K and is spaced from the shaft S. The flange 18 is arranged to ride on an extension 19 of the bearing sleeve 11, this extension being semi-cylindrical as shown in Figure 1, thus leaving a semi-cylindrical space 20 between the shaft S and the annular flange 18.

In this space 20 is positioned a half ring lock element 21 having its inner surface of the same radius of curvature as that of the shaft. The external surface of the half ring lock element is of a different radius of curvature than the inner surface and eccentric so that one end of the element is thicker than the other, as shown, to thus provide a tapered space between the lock element and the flange 18 and form the locking element into a curved wedge shape. In this space is positioned a curved lock spring 22 superposed on the half ring lock element and having one end connected to the flange 18 of the locking collar by being received in a slot 23, which collar, as already noted, rotates with the locking lever hub.

When the parts are in the position shown the locking mechanism will be released as the locking element 21 will not be forced into engagement with the shaft to hold or lock it. Consequently, the shaft S can be rotated freely, as desired, in either direction. If it should be desired to lock the shaft in any set position, then all that needs to be done is turn the locking lever in the direction of the arrow shown in Figure 1. This will rotate the hub 14 and locking collar 16 as a unit and carry therewith the locking spring 22, since such is attached to the flange 18 of the collar. The locking spring thus will move into the wedge space between the flange 18 and the half ring locking element and thereby push it into seizure with the shaft to thus cause a locking. When locking action is present, the locking element will have its larger end engaging the semi-cylindrical extension 19 of the bearing collar which is fixed to the panel P. This engagement occurs before seizure of the shaft. Thus, when seizure of the shaft takes place and locking occurs, there will not be cause for any shaft rotation or shifting during the procedure of locking.

The intensity of the locking action will depend on the extent of rotation of the locking lever. The locking action can also be readily varied by the selection of the type of material used for the locking element. If the material is somewhat compressible and of a high friction coefficient, then the intensity will be greater for any set position of the lever. The intensity of the locking action will always be the same for any given set position of the locking lever 13. The relation between the locking lever and locking collar can be shifted as desired by the set screws 17.

Unlocking is accomplished by a reverse rotation of the locking lever, that is, in a direction opposite the arrow.

An important feature of my locking mechanism is that it can be arranged to lock by a rotation of the lever in either direction. If it is desired to cause a locking by a rotation of the lever in a direction reverse to that indicated by the arrow, then the half ring locking element is merely reversed, as also will be the locking spring.

It will be noted that my locking mechanism is compact, as it closely surrounds the shaft and the locking element acts directly on the shaft in an encompassing relation.

I am aware that modification in the structure shown can be made without departing from the fundamental principles of my invention. For example, means other than the spring, such as a pin or ball, can be used to act on the locking element. The eccentricity of the two curved surfaces of the locking element can be varied to change the amount of rotation of the lever necessary to obtain a desired locking intensity. Also, the length of the locking element can be varied as well as its shifting space. Other changes will become apparent and therefore I desire it to be understood that the scope of the invention is not to be limited, except in accordance with the structural terms of the appended claims and equivalents thereof.

What is claimed is:

1. In locking structure of the class described, a shaft, a support plate therefor having an opening larger than the shaft through which the shaft extends, a support member surrounding the shaft and having a part extending into the opening, a nut clamping the support member to the plate, a locking collar mounted to rotate on the support member, a curved locking element within the locking collar and arranged to engage the shaft by a lateral shifting movement with respect to the shaft axis, stop means for the locking element carried by the support member, means for shifting the locking element into engagement with the shaft and permitting its release by a rotation of the locking collar on the support member, an actuating hub on the locking collar, and means for adjustably connecting the actuating hub to the collar at any desired position about its periphery.

2. The locking structure of claim 1 in which the actuating hub is provided with an annular flange positioned between the supporting member and plate and the adjustable connecting means comprises a set screw between the hub and the locking collar.

3. In locking structure of the class described, a shaft, a support plate therefor having an opening larger than the shaft through which the shaft extends, a support member surrounding the shaft and having a curved surface and a part extending into the opening, a bearing nut for the shaft mounted in the member and clamping it to the plate, a locking collar mounted to rotate on the support member, a curved wedge shaped locking element within the locking collar and arranged to engage the shaft by a lateral shifting movement with respect to the shaft axis, stop means for the locking element carried by the support member, and means for shifting the locking element into engagement with the shaft and permitting its release by a rotation of the locking collar on the support member, said last named means comprising an element on the locking collar movable between the curved wedge shaped locking element and a curved surface on the support member.

References Cited in the file of this patent

UNITED STATES PATENTS

| | | |
|---|---|---|
| 1,325,639 | Hoagland | Dec. 23, 1919 |
| 1,568,295 | Schleicher | Jan. 5, 1926 |
| 1,671,879 | Zamboni | May 29, 1928 |
| 2,251,253 | Miller | July 29, 1941 |
| 2,401,351 | Herbst et al. | June 4, 1946 |
| 2,651,281 | Nathan | Sept. 8, 1953 |

FOREIGN PATENTS

| | | |
|---|---|---|
| 20,204 | Great Britain | Sept. 11, 1906 |